United States Patent [19]

Lee et al.

[11] Patent Number: 5,278,238
[45] Date of Patent: Jan. 11, 1994

[54] POLYCYCLOOLEFIN POLYMER ALLOYS UTILIZING DISPERSED ETHYLENE-BASED FUNCTIONAL POLYMERS

[75] Inventors: Biing-Lin Lee, Broadview Heights; Robert J. Minchak, Parma Heights, both of Ohio

[73] Assignee: The B.F.Goodrich Company, Akron, Ohio

[21] Appl. No.: 448,493

[22] Filed: Dec. 11, 1989

Related U.S. Application Data

[62] Division of Ser. No. 22,317, Mar. 5, 1987, abandoned.

[51] Int. Cl.$^5$ ............... C08L 45/00; C08L 31/04
[52] U.S. Cl. .................. 525/216; 525/210; 525/211
[58] Field of Search ............ 525/216, 211, 210

[56] References Cited

U.S. PATENT DOCUMENTS

| | | | |
|---|---|---|---|
| 3,023,200 | 2/1962 | Epstein | 526/283 |
| 4,002,815 | 1/1977 | Minchak | 526/283 |
| 4,069,376 | 1/1978 | Minchak | 526/137 |
| 4,110,528 | 8/1978 | Minchak | 526/283 |
| 4,262,103 | 4/1981 | Minchak | 526/114 |
| 4,338,227 | 7/1982 | Ballard | 524/143 |
| 4,360,622 | 11/1982 | Tsuchiya et al. | 525/216 |
| 4,380,617 | 4/1983 | Minchak et al. | 526/161 |
| 4,400,340 | 8/1983 | Klosiewicz | 264/328.6 |
| 4,418,178 | 11/1983 | DeWitt | 525/97 |
| 4,418,179 | 11/1983 | DeWitt et al. | 525/249 |
| 4,426,502 | 1/1984 | Minchak | 526/172 |
| 4,481,344 | 11/1984 | Newburg | 526/283 |
| 4,507,453 | 3/1985 | Tom | 526/283 |
| 5,179,171 | 1/1993 | Minami | 525/288 |

FOREIGN PATENT DOCUMENTS 0107081 5/1984 European Pat. Off. .
0203799 12/1986 European Pat. Off. .

OTHER PUBLICATIONS

The Oreshkin, et al, article in the "European Polymer Journal," 13 (1977), pp. 447–450.

Primary Examiner—James J. Seidleck
Assistant Examiner—I. Zemel
Attorney, Agent, or Firm—Daniel J. Hudak; Thoburn T. Dunlap; Nestor W. Shust

[57] ABSTRACT

Alloys of polycycloolefin polymers are produced by dissolving an ethylene-based functional polymer in at least one polycycloolefin monomer and polymerizing the mixture. Various polycycloolefin catalysts can be utilized. Often it is desirable to utilize bulk polymerization including reaction injection molding (RIM), liquid injection molding (LIM), reinforced reaction injection molding (RRIM), resin transfer molding (RTM), and the like. The alloys have improved properties such as impact strength, solvent resistance, as well as improved thermal aging properties such as retention of impact strength.

10 Claims, No Drawings

POLYCYCLOOLEFIN POLYMER ALLOYS UTILIZING DISPERSED ETHYLENE-BASED FUNCTIONAL POLYMERS

CROSS-REFERENCE

This is a division of application Ser. No. 07/022,317, filed Mar. 5, 1987, for "POLYCYCLOOLEFIN POLYMER ALLOYS UTILIZING DISPERSED ETHYLENE-BASED FUNCTIONAL POLYMERS," Robert John Minchak and Biing-lin Lee, inventors, now abandoned.

FIELD OF THE INVENTION

The present invention relates to forming a polymer alloy by dissolving ethylene-based functional polymers with polycycloolefin monomers. The invention also relates to polymerization of such polycycloolefins in the presence of halogenated-free catalyst systems as well as to bulk polymerization thereof.

BACKGROUND

Heretofore, polycycloolefin polymers and methods for their preparation have been described in U.S. Pat. Nos. 4,002,815; 4,069,376; 4,110,528; 4,262,103; and 4,380,617, all assigned to BFGoodrich (Robert J. Minchak and co-workers).

U.S. Pat. No. 4,400,340 to Klosiewicz relates to a process for preparing a polydicyclopentadiene in the absence of a diluent and conducting the polymerization reaction in a mold.

U.S. Pat. No. 4,418,179 to Dewitt, Minchak, Lee, and Benedikt relates to impact modified polycycloolefins in which polyolefin powders such as polyethylene are dispersed in the cycloolefin monomer and then polymerized to obtain polycycloolefin polymer blends.

U.S. Pat. No. 4,418,178 to DeWitt, is similar to U.S. Pat. No. 4,418,179 but also incorporates elastomer therein.

U.S. Pat. No. 4,380,617 to Minchak, noted above, also relates to a catalyst system including an organoammonium molybdate or tungstate catalyst.

U.S. Pat. No. 4,426,502 to Minchak relates to a bulk polymerization method for polymerizing polycycloolefin monomers wherein an alkylaluminum halide catalyst contained an alkoxy group thereon to inhibit reducing power of the catalyst and hence to essentially eliminate any room temperature reaction.

The Oreshkin, et al article in the *European Polymer Journal*, 13 (1977) on pages 447–450, reports the use of silane compounds as cocatalysts with molybdenum and tungsten catalyst in ring opening polymerization.

U.S. Pat. No. 4,481,344 to Newburg discloses that high conversions can be obtained by ring opening polymerization of dicyclopentadiene in the presence of a metathesis catalyst system and also in the presence of a halogen containing hydrocarbyl additive which contains at least one trihalogen substituted carbon atom or at least one activated halogen atom.

U.S. Pat. No. 4,507,453 to Tom relates to a high impact strength homopolymer formed by the metathesis-catalyzed polymerization of dicyclopentadiene.

SUMMARY OF THE INVENTION

Polycycloolefin polymer alloys are made by dispersing (for example dissolving) an ethylene-based functional polymer in at least one polycycloolefin monomer. Bulk polymerization of the polycycloolefin monomers is carried out in the presence of a metathesis halogen-free catalyst system or a metathesis halogen containing catalyst system. Desired processing methods include reaction injection molding (RIM) and resin transfer molding (RTM). The polycycloolefin polymer alloy exhibits improved physical properties as well as good retention of thermal stability properties.

DETAILED DESCRIPTION OF THE INVENTION

The polycycloolefin monomers utilized in the present invention are well known to the art as well as to the literature. A plurality of the various monomers is generally utilized so that an interpolymer, for example a copolymer, a terpolymer, etc. are produced as an alloy or blend with an ethylene-based functional polymer.

The polycycloolefin monomers of the present invention include monocycloolefin monomers and/or polycycloolefin monomers. The monocycloolefin monomers include monoolefins as well as diolefins containing from 4 to 14 carbon atoms, and preferably from 4 to 9 carbon atoms with specific examples including cyclobutene, cyclopentene, cycloheptene, cyclooctene, 1,5-cyclooctadiene, and the like. Of the various monocyclic olefin monomers, cyclopentene, cyclooctene and 1,5-cyclooctadiene are generally preferred. Since the invention relates to the production of polycycloolefin polymers, the monocycloolefin monomers must be utilized in association with at least one polycycloolefin monomer.

The polycycloolefin monomers contain from 2 to 10 rings and preferably from 2 to 4 rings. The polycycloolefins utilized as monomers generally contain from 7 to 35 carbon atoms and from 1 to 4 double bonds, and more preferably from about 7 to about 13 carbon atoms and 1 or 2 double bonds. Specific examples of monomers which can be utilized to make homopolymers or interpolymers include norbornene, methylnorbornene, tetracyclododecene, methyltetracyclododecene, dimethyldicyclopentadiene, ethylnorbornene, propylnorbornene, butylnorbornene, phenylnorbornene, and cyclohexenylnorbornene. Desired polycycloolefin monomers which can be utilized in association with other monomers, that is, to form an interpolymer, include cyclopentadiene trimer, vinylnorbornene, and ethylidenenorbornene. Preferred polycycloolefin monomers include dicyclopentadiene, norbornene, methylnorbornene, ethylnorbornene, propylnorbornene, phenylnorbornene, and cyclohexenylnorbornene.

Various polymers can also be made by reacting a norbornene type monomer having the formula as set forth hereinbelow with various other monocycloolefins or polycycloolefins set forth above, as known to the art and to the literature. The norbornene formula is generally as follows:

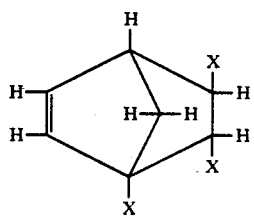

wherein X is hydrogen or an alkyl having from 1 to 6 carbon atoms and more desirably from 1 to 3 carbon atoms. Examples of specific norbornene-type monomers include 2-norbornene, 5-methyl-2-norbornene, 5-ethyl-2-norbornene, 5-phenyl-2-norbornene, and the like. Generally, 2-norbornene and 5-methyl-2-norbornene are preferred. Naturally, homopolymers can be made from the above-noted monomers.

Examples of suitable copolymers of the present invention include those made from norbornene and/or methylnorbornene with either methyltetracyclododecene, or tetracyclododecene, or dicyclopentadiene. Examples of suitable terpolymers of the present invention include those made from dicyclopentadiene, methylnorbornene, and methyltetracyclododecene monomers; methylnorbornene, norbornene, and methyltetracyclododecene monomers; and methylnorbornene, phenylnorbornene, and tetracyclododecene monomers.

Preferred polycloolefin polymers of the present invention include those made from dicyclopentadiene, methylnorbornene and methyltetracyclododecene monomers; methylnorbornene, norbornene, and methyltetracyclododecene monomers; and methylnorbornene, ethylidenenorbornene, and methyltetracyclododecene monomers.

The polycycloolefin monomers of the present invention are polymerized in the presence of various catalyst generally utilizing bulk polymerization as discussed more fully hereinbelow. The polycycloolefin polymers produced thus desirably have a glass transition temperature which is higher than the polymerization temperature which often is the temperature of the bulk polymerization mold. Generally the polycycloolefin polymers produced have a glass transition temperature, Tg, of from about 0° C. to about 250° C., and desirably from about 45° C. to about 180° C. However, a plastic compound, that is a polycycloolefin polymer having a Tg of 45° C. or greater, is desired.

According to the present invention, an ethylene-based functional polymer is dissolved in the various polycycloolefin monomers. By the term "dissolved", it is meant that the ethylene-based polymer is adequately distributed to produce a polymer alloy blend having improved thermal aging properties. It is desired in the present invention that the ethylene-based polymer be substantially, that is at least 80% by weight or preferably at least 90% by weight thereof, be dissolved in the polycycloolefin monomers. Thus, in situations wherein the ethylene-based polymer is not substantially or completely dissolved in the particular polycycloolefin monomers, the monomers are heated to dissolve the polymer therein. The dissolving time can generally vary from less than a minute to approximately 1 hour or less. The formed solution can subsequently be utilized in bulk polymerization.

By the term "ethylene-based functional polymer" it is meant a copolymer or desirably a blend of two or more copolymers (e.g. a primary or a secondary) of ethylene and at least one other monomer containing functional groups thereon. Considering the copolymer, the functional monomer utilized in making the ethylene-based copolymer (e.g. the primary copolymer) can be a vinyl ester having a total of from 1 to about 10 carbon atoms with acetate being preferred. The amount of the vinyl ester component of the ethylene-based functional copolymer is from about 5% to about 50% by weight and desirably from about 10% to about 35% by weight.

The ethylene-vinyl ester copolymers are desirably utilized in a primary amount with a minority amount of another (i.e. a secondary) ethylene-based vinyl and functional containing copolymer. The additional monomers of the second copolymer which contain at least one functional group are usually vinyl organic acids or organic anhydrides. For example, the additional functional comonomers can be acrylic acid, methacrylic acid, and various hydrocarbon derivatives thereof as well as maleic anhydride, or various derivatives thereof, wherein said acids and said anhydrides have a total of from 3 to 12 carbon atoms. Methacrylic acid is a preferred comonomer. The additional vinyl and functional monomer of the secondary copolymer generally exists in a small amount as from about 1% to about 25% by weight based upon the total weight of the secondary copolymer. When utilized, the amount of the secondary copolymer is from about 0% or 1% to about 50% by weight and desirably from about 5% to about 40% by weight. Thus, the amount of the primary ethylene-based functional copolymer exists in an amount of from about 50% to about 100% by weight and preferably from about 60% to about 95% by weight.

Other types of ethylene-based functional copolymers or copolymers are set forth in U.S. Pat. No. 4,230,830, which is hereby fully incorporated by reference. This patent relates to a polymer blend comprising or consisting essentially of:

a. about from 80%–99% by weight of a first olefinic polymer selected from
   (i) nonpolar ethylene polymers and copolymers having a density of about from 0.930 to 0.965 g/cc, and
   (ii) copolymers of ethylene having up to about 30 weight percent of at least one ethylenically unsaturated ester having from 4 to 12 carbon atoms; and
b. about from 1%–19% of a second olefinic polymer selected from the group consisting of
   (i) nonpolar ethylene polymers and copolymers having a density of about from 0.945 to 0.965 g/cc, and
   (ii) terpolymers of ethylene, at least one alpha-olefin having from 3–6 carbon atoms, and at least one nonconjugated diene; the second olefinic polymer being thermally grafted with an unsaturated acid or anhydride to give a copolymer having about from 0.02 to 4.0 weight percent of grafted succinic groups, provided, however, that when the second olefinic polymer is (ii), then the first olefinic polymer is (ii).

Regardless of whether or not a second or a third, etc. ethylene-based functional copolymer is utilized, the melt index of the overall ethylene-based functional polymer, that is an ethylene-vinyl ester copolymer or blends thereof, is from about 2 to 40 g/10 min and desirably from about 15 to about 40 g/10 min. The density is from about 0.92 to about 1.1 g/cc and desirably from about 0.92 to about 0.96 g/cc. The ethylene-based functional polymer or blends thereof useful in the present invention are available from DuPont under the name Bynel CXA resins such as CXA resin 1123, resin 1124, or resin 3101. A specific example of a suitable ethylene-based functional polymer is a blend of 92.5% by weight of a primary ethylene-vinyl acetate copolymer containing 28% by weight of vinyl acetate therein and 7.5% by weight of a secondary ethylene-methacrylic acid copolymer containing 15% by weight of methacrylic acid therein.

The amount of the ethylene-based functional polymer is generally a minor amount of the polycycloolefin polymer alloy of the present invention. That is, it has been unexpectedly found that when the ethylene-based functional polymer is dissolved in the polycycloolefin monomers, as opposed to directly blending the same with the polycycloolefin polymer, smaller amounts are required. Accordingly, an amount of 15% by weight or less of the ethylene-based functional copolymer is typically utilized, generally an amount of from about 1% to about 10% by weight, desirably from about 3% to about 7% by weight, and preferably from about 3% to about 5% by weight based upon the total weight of said ethylene-based functional copolymer and said polycycloolefin monomers. Higher molecular weight ethylene-based functional copolymers having a melt index less than 2 are generally not desirable in that a grainy surface or finish is generally produced in the polycycloolefin polymer alloy.

The mixtures or blends of the various polycycloolefin monomers and the ethylene-based functional copolymers can be bulk polymerized utilizing various polycycloolefin catalyst or catalyst systems. Generally, polymerization is conducted by ring opening polymerization of a polycycloolefin monomer, for example, a norbornene type monomer, or a mixture thereof, with or without at least one other polymerizable monomer, in the presence of a first catalyst system such as a metathesis catalyst system, containing for example an alkylaluminum halide cocatalyst and an organoammonium molybdate or tungstate catalyst that is soluble in a hydrocarbon reaction solvent and the polycycloolefin monomer. A description of such catalyst, and the amount thereof, is set forth in U.S. Pat. No. 4,380,617 which is hereby fully incorporated by reference.

As is well known, and which is applicable herein, the reducing power of the cocatalyst can be attenuated to provide for additional time for mixing the various ingredients at room temperature and for work interruptions before initiating the polymerization reaction at a higher temperature. To do this, an alkoxy or an aryloxy group is introduced into the alkylaluminum cocatalyst by pre-reacting the cocatalyst with oxygen, an alcohol, or a phenol before adding the cocatalyst to the system. Suitable alcohols, such as ethanol and propanol, are those which yield an alkoxyalkylaluminum cocatalyst that is soluble in the cycloolefin monomer to be polymerized. Such a reaction with an alcohol is conducted in absence of air and water by providing a blanket of nitrogen and by mixing the ingredients. The reaction is rapid and results in evolution of volatile hydrocarbons, such as ethane, if the cocatalyst used were triethylaluminum.

Instead of pre-reacting the cocatalyst with an alcohol, the cocatalyst and the alcohol can be reacted in situ. Of course, the alkoxy groups are provided by alcohols, however, alkoxy or aryloxy groups can be supplied by other hydroxyl-containing materials that come in contact with the cocatalyst before or during polymerization. For instance, any ingredient in the formulation that contains hydroxyl groups can provide such groups for reaction with the cocatalyst to lower its reducing potency. Examples of such materials are certain fillers and phenolic stabilizers that have available active hydroxyl groups for reaction with the cocatalyst. A further discussion of the use of alcohol is set forth in U.S. Pat. No. 4,426,502 which is hereby fully incorporated by reference.

The above discussed first metathesis catalyst system can be utilized within rapid bulk polymerization systems such as RIM or in slower systems such as LIM, and the like. The distinguishing feature is that larger amounts of alcohol slow down the reduction of the transition metal in forming an active polymerization catalyst and in effect produces an induction period. The overall reaction time to cure is thus generally longer, and higher mold temperatures are needed to initate polymerization.

The alkyl groups in the alkoxyaluminum halide and the aryl groups in the aryloxyaluminum halide cocatalyst contain 1 to 1 carbon atoms, preferably 2 to 4. The preferred cocatalysts are the alkylaluminum halide compounds. The aryloxy groups are preferably derived from unhindered phenols and substituted and unsubstituted resorcinols. Especially preferred aryloxy groups are selected from phenoxy groups derived from a phenol that is unhindered at 2 and 6 positions. Specific examples of such compounds are phenol itself and derivatives of unsubstituted resorcinol where one of the two hydroxyl groups is esterified, as to a benzoate group.

Although phenolic stabilizers are given as an example of a material that may have available hydroxyl groups for reaction with the cocatalyst, it was discovered that hindered phenols do not form phenoxyaluminum groups and are relatively inert in this chemistry. Therefore, hindered phenols, which are known antioxidants, do not appear to provide the hydroxyl moiety for reaction with the cocatalyst for lowering reducing power of such cocatalysts.

A second metathesis catalyst system described herein includes at least one polycycloolefin monomer, as for example containing one or more norbornene groups, a halogen free alkylaluminum cocatalyst, a hindered phenol, and a catalyst selected from tungsten and molybdenum compounds. An optional modifier compound such as an alkyltin oxide can also be utilized.

Contrary to the disclosure in the Minchak U.S. Pat. No. 4,426,502, the halogen-free cocatalyst can be used to polymerize polycycloolefins in the presence of a suitable metathesis catalyst. Such polymerizations are thermally initiated and are conducted at an elevated temperature of about 50° C. to 200° C., preferably at 90° to 160° C. These temperatures are mold temperatures. The system containing the catalyst and the cocatalyst is slow at room temperature, which means that pot life is adequate at ambient conditions. However, this reaction takes place rapidly at elevated temperatures and can be completed in less than about one-half hour, preferably in less than one-quarter hour, and more preferably in less than about 5 minutes.

If polymerization is conducted by reaction injection molding, polymerization is completed and a hard molded product can be extracted usually in less than 1 minute when polymerization temperature in the range of 50° C. to 200° C. is used. In a liquid injection molding system, reaction time is generally slower and hence cure time is usually from about 5 to about 15 minutes.

As noted, the cocatalysts suitable herein, that is in the second metathesis catalyst system, are free of halogen and are soluble in the monomer to be polymerized. Such cocatalysts are selected from alkylauminum compounds, particularly trialkylaluminum compounds containing 1 to 18, preferably 2 to 4 carbon atoms per alkyl group. The trialkylaluminum cocatalysts are pyrophoric compounds and should be kept in a monomer, such as a norbornene-containing cycloolefin. Such compounds, which are normally liquid, should be kept in an inert environment away from oxygen and moisture. The cocatalyst is preferably used as a solution of the cocatalyst in a cycloolefin, such as a 0.5 molar solution in a cycloolefin in which the cocatalyst is soluble.

The halogen-free modifier compound noted herein is used in conjunction with a halogen-free cocatalyst and a suitable metathesis catalyst to polymerize a polycycloolefin monomer, e.g. a norbornene-containing cycloolefin monomer or a mixture thereof. It is the presence of a modifier compound such as an alkyltin oxide which makes it possible to use a halogen-free cocatalyst in conjunction with a suitable catalyst to polymerize one or more of the cycloolefins, in the presence or absence of a hindered phenol. In absence of the tin modifier compound and the hindered phenol, the polymerization cannot be conducted successfully to high conversion even at an elevated temperature. However, in absence of modifier compound but in presence of the hindered phenol, a useful degree of polymerization exceeding 80% conversion can be attained.

When using a tin modifier compound, the cocatalyst should be free of halogen. If a halogen-containing cocatalyst is used in such a system, polymerization of such cycloolefins is poor, as indicated by low conversion of less than 50%.

The alkyltin oxide modifier includes bis(trialkyltin)oxides and bis(triphenyltin)oxides of formula I and alkyalkoxytin compounds of formula II, below:

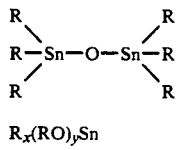

$R_x(RO)_y Sn$    II where the R groups in formula I and II can be same or different alkyl and aryl groups of 1 to 18, preferably 2 to 8 carbon atoms in each. In formula II, the sum of x and y is 4 with y being 1 to 3, preferably 1 to 2. The preferred tin modifiers of formula I include those whereins all of the R groups are the same, such as bis(trialkyltin)oxides and bis(triphenyltin)oxides whereas preferred tin modifiers of formula II contain 1 to 3 of same R groups and 1 to 2 same alkoxy groups, such as tri-n-butylethoxy-tin compound. Particularly preferred modifier compounds are selected from bis(trialkyltin)oxides. The preferred bis(trialkyltin) oxides are in the form of a liquid which can be used neat or in a monomer solution.

The tin modifier compound appears to work to alleviate the action of the alkylaluminum cocatalyst to provide stability at room temperature and polymerization to a high conversion at an elevated temperature.

The ammonium or organoammonium molybdates and tungstates suitable herein as catalysts are defined as follows:

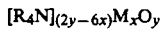

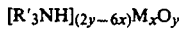

where O represents oxygen; M represents either molybdenum or tungsten; x and y represent the number of M and O atoms in the molecule based on the valence of +6 for molybdenum, +6 for tungsten, and −2 for oxygen; and the R and R' radicals can be same or different and are selected from hydrogen, alkyl, and alkylene groups each containing from 1 to 20 carbon atoms, and cycloaliphatic groups each containing from 5 to 16 carbon atoms. All of the R and R' radicals cannot be hydrogens nor be small with respect to the number of carbon atoms since such a condition will render the catalyst essentially insoluble in the monomers, hydrocarbons, and most organic solvents. In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the R' radicals are selected from alkyl groups each containing from 1 to 18 carbon atoms wherein the sum of carbon atoms on all of the R' radicals is from 15 to 54, more preferably from 21 to 42.

In addition to the above catalysts, another modifier which can be utilized with the first metathesis (halogen containing) catalyst system as an activator. Referred to herein is generally a halometal compound which has the following formula:

$R_m Y X_n$ where m is 0 to 4 and n is 1 to 5. R is individually selected from organic radicals selected from hydrogen, alkyl, alkenyl, alkoxy, aryl, alkaryl and saturated and unsaturated cyclic groups. The quantity Y is a metal selected from tin, lead, magnesium, antimony, boron, germanium, and silicon. The quantity X is individually selected from halogens which include chlorine, bromine, iodine and fluorine, preferably chlorine. In a preferred embodiment, the initiator is selected from organic chlorosilanes of the following formula:

$R_m Si X_n$ where m is 0 to 3, and n is 1 to 4; R is individually selected from hydrogen, alkyl groups of 1 to 12 carbon atoms, alkoxy groups of 1 to 12 carbon atoms, alkenyl groups of 2 to 12 carbon atoms, aryl groups of 6 to 18 carbon atoms, alkaryl groups wherein there is at least one alkyl substituent on the aryl moiety containing 1 to 4 carbon atoms, and saturated and unsaturated monocyclic, dicyclic and polycyclic groups containing a total of 5 to 12 carbon atoms. In an especially preferred embodiment, R is selected from hydrogen, alkyl and alkoxy groups containing 1 to 6 carbon atoms. Specific examples of preferred activators include the following chlorosilanes: dimethylmonochlorosilane, dimethyldichlorosilane, diphenyldichlorosilane, tetrachlorosilane, and the like. The amount of the activator is in the range of 0.05 to 10 millimoles per mole of cycloolefins polymerized, preferably 0.1 to 2.0 millimoles.

Regardless of which metathesis catalyst system is utilized, the catalyst is employed at the level of about 0.01 to 50 millimoles, preferably 0.1 to 10 millimoles, of molybdenum or tungsten per mole of monomer charge to be polymerized. A mixture or a combination of the catalysts can be used. The preferred range is particularly applicable when the organoammonium molybdate or tungstate catalysts are used in bulk polymerization of the cycloolefins. The molar ratio of the halogen-free trialkylaluminum cocatalyst as well as of the alkylaluminum halide cocatalyst to the catalyst can be in the range of 200:1 to 1:10, preferably in the range of 10:1 to 2:1. Again, the preferred range is particularly applicable to the use of organoammonium molybdate or tungstate catalyst in bulk polymerization of the monomers. The molar ratio of the tin modifier compound to the aluminum in the cocatalyst of the second catalyst system can be in the range of 0.1 to 3 moles, preferably 0.5 to 2 moles, and especially about 1.25 moles, all based on 1 mole of aluminum.

As noted above, both the first catalyst system and the second catalyst system, optionally, can contain, that is be reacted with various alcohols having from 1 to 12 carbon atoms can be utilized as they tend to inhibit the reaction rate by rendering the aluminum compound ineffective at room temperature as a reducing agent. Desirably, butyl, propyl and octyl alcohol are preferred. The amount of alcohol is generally from about 0.1 to about 2.0 equivalents of alcohol per equivalent of dialkylaluminum with from about 0.8 to about 1.5 equivalents being preferred.

Other conventional additives can also be used in conjunction with polymerization of the cycloolefins by bulk polymerization, or another form of polymerization. Such additives include antioxidants, fillers, impact modifiers, flame retardants, pigments, processing aids, mold release agents, and the like.

The molded products produced as described above are resistant to high temperatures and moisture, and have outstanding electrical and mechanical properties. Some particularly suitable applications are electronic products resulting from molding and other forming processes.

Sufficient degree of polymerization can be attained with the halogen-free catalyst system, and molded products can be made from polymerized cycloolefins by conducting polymerization in absence of the alkyl tin oxide. This approach is characterized by the presence of not only a halogen-free catalyst and cocatalyst, described above, but also of a halogen-free hindered phenol in the polymerization of cycloolefins containing a norbornene group. The procedure, ratio of catalyst to cocatalyst and materials are the same as described above except that the alkyltin oxide is omitted and a hindered phenol is included. The amount of the hindered phenol can vary widely from 0.0001 mole to 0.1 mole, preferably 0.001 to 0.05 mole, per mole of the monomer charge.

It is surprising that the hindered phenol has such an effect on the polymerization of cycloolefins in absence of a modifier compound. As noted above, polymerizations of cycloolefins can be conducted in the presence of a modifier compound wherein an antioxidant can be included or excluded. The antioxidants which can be used include hindered phenols, however, such polymerizations in the presence of a modifier compound are not significantly affected by the presence or absence of a hindered phenol. However, in absence of a modifier compound, the presence of a hindered phenol is essential in order to attain a sufficient degree of polymerization and a molded product with adequate properties.

Suitable hindered phenols for purposes herein include those generally defined as follows:

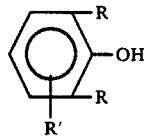

where R groups are individually selected from alkyl groups containing 1 to 6 carbon atoms, and substituted and unsubstituted alicyclic groups of 4 to 8 carbon atoms; and R', of which there can be 1 to 3 but preferably 1 to 2 such groups, is selected from hydrogen, alkyl groups containing 1 to 12, preferably 2 to 8 carbon atoms, and substituted and unsubstituted alicyclic groups of 4 to 8 carbon atoms. In a preferred embodiment, R groups are tertiary alkyl groups, particularly t-butyl groups. There is one R' group in the preferred embodiment at the 4-position, which is selected from alkyl groups, particularly lower alkyl group.

Regardless of the exact type of catalyst system utilized, the polycycloolefin monomers can be polymerized in the presence of such catalyst and the ethylene-based functional copolymers. Polymerization can either be carried out preferably in bulk. Bulk polymerization including RIM, LIM, RLIM, RMRIM, RMLIM, resin transfer molding (RTM), and the like are known to the art as well as to the literature.

Bulk polymerization is polymerization that is carried out in the absence of a solvent or a diluent. Reaction injection molding or RIM is a type of bulk polymerization wherein a monomer in a liquid state is transferred or is injected into a mold where polymerization of the monomer takes place in the presence of a catalyst system. RIM is not conventional injection molding for melt polymers and is readily distinguishable therefrom.

RIM is a low pressure, one-step or one-shot, mix and injection of two or more liquid components into a closed mold where rapid polymerization occurs resulting in a molded plastic product. RIM differs from injection molding in a number of important aspects. Injection molding is conducted at pressures of about 10,000 to 20,000 psi in the mold cavity by melting a solid resin and conveying it into a mold maintained at a temperature less than the melt temperature of the resin. At an injection temperature of about 150° to 350° C., viscosity of the molten resin in an injection molding process is generally in the range of 50,000 to 1,000,000 and typically about 200,000 cps. In the injection molding process, solidification of the resin occurs in about 10 to 90 seconds, depending on the size of the molded product, following which, the molded product is removed from the mold. There is no chemical reaction taking place in an injection molding process when the resin is introduced into a mold.

In a RIM process, viscosity of the materials fed to a mix chamber is about 1 to 10,000 cps, preferably 1 to about 1500 cps, at injection temperatures varying from room temperature for to about 100° C. for different polycycloolefin monomer systems. Mold temperatures in a RIM process are in the range of about 50° C. to 150° C. and pressures in the mold are generally in the range of about 50 to 150 psi. At least one component in the RIM formulation is a monomer that is polymerized to a polymer in the mold. The main distinction between injection molding and RIM resides in the fact that in RIM, a chemical reaction is initiated on mixing, with optional heating, and is completed in the mold to transform monomers to a polymeric state. For practical purposes, the chemical reaction must take place rapidly in less than about 2 minutes.

A LIM process is similar to a RIM system except that generally an impingement head is not utilized. Rather, a simple mixer is utilized such as a static mixer, an agitating mixer, and the like. Moreover, in a LIM system, the injection molding cycle is carried out over a longer period of time and thus the chemical reaction can take place in a period of up to about 5 or 10 minutes.

Various reinforcing particles can also be utilized, that is injected with the solution when utilizing either the RIM or the LIM process. As a practical manner, the RIM process is not suitable and hence reinforced particles are generally utilized only in a LIM process, that is a reinforced liquid injection molding process. Another alternative is to utilize a mat which already exists in a mold, for example a fiberglass mat, or the like. Accordingly, such systems are called RMRIM, RMLIM, or RTM. Due to the reaction cure times as well as injection molding times, the RMLIM system is generally preferred for some operations, RMRIM or RTM for others.

Hence, the blends or alloys of the present invention can be utilized in any of the above noted bulk polymerization systems as well as variations thereof. Inasmuch as the above systems are generally conventional or known to the art as well as to the literature, they have not been discussed in detail, but rather briefly discussed herein for purposes of brevity.

U.S. Pat. No. 4,426,502 to Minchak describes bulk (e.g. RIM) polymerization of cycloolefins using a modified cocatalyst with a catalyst whereby polymerization of the cycloolefin monomers can be conducted in absence of a solvent or a diluent. The alkylaluminum halide cocatalyst is modified by pre-reacting it with an alcohol or an active hydroxy-containing compound to form an alkyoxyalkylaluminum halide or an aryloxyalkylaluminum halide which is then used in the polymerization reaction. The pre-reaction can be accomplished by using oxygen, an alcohol, or a phenol. Such modification of the cocatalyst results in lowering of its reducing potential of the catalyst.

Regardless of whether the halide metathesis or the halogen-free metathesis catalyst system is utilized, the reaction rate is generally slowed down by utilized of the above-described alcohols. Thus, depending if little or no alcohol is utilized, the halide metathesis catalyst system can cure the various polycycloolefins in a matter of minutes and even seconds. If high amounts of alcohol are utilized, the cure can be a matter of hours and even days.

It is important to lower the reducing power of the cocatalyst of either metathesis system in order to make such bulk polymerization reactions practical. When a monomer diluted with unmodified alkylaluminum cocatalyst is mixed with a monomer-diluted catalyst to polymerize a cycloolefin, the reaction is very rapid. In such systems, the polymerization is usually unacceptable because polymer formed at the interfaces of the two streams during intermingling prevents thorough mixing and results in poor conversions. Modifying the cocatalyst by pre-reaction with hydroxy-containing materials reduces the activity of the cocatalyst to the point where adequate mixing of the liquid components can occur and acceptable polymer products can be produced. Sometimes, a cycloolefinic monomer will contain various impurities that naturally reduce the activity of the cocatalyst. In such cases, it is not necessary to add active hydroxy-containing materials to reduce the activity of the cocatalyst. With the modified cocatalyst, mixing of the cycloolefins, and other components, can be carried out at lower temperatures, such as room temperature, without immediately initiating polymerization. The cocatalyst can be formulated to allow a reasonable pot life at room temperature and thermal activation in the mold of the mixed liquid components. The cocatalyst can also be formulated to give mixing initiated RIM systems.

When utilizing a bulk polymerization method, the mixture or blend of the polycycloolefin monomers and the ethylene-based functional copolymers as well as the catalyst and any optional additives therein can be added to a bulk polymerizing mold having a temperature well below the Tg of the polymerized polycycloolefin polymers. This is especially desirable since the reaction is decidedly exotheromic and can result in a temperature increase of the mold up to about 120° C. The final mold temperature is thus from about 50° C. to about 200° C., generally from about 50° C. to about 150° C. and preferably from about 50° C. to about 90° C. Of course, such temperatures will vary depending upon the specific type of catalyst system utilized, the specific type of polycycloolefin monomers, and the like. When utilizing the catalyst systems described hereinabove, the polycycloolefin monomer and ethylene-based functional copolymer mixture has a good shelf life, that is up to about 24 hours. Should longer times be desirable, the catalyst system is not added to the mixture but kept separate. Thus, upon the point in time of carrying out the polymerization of the polycycloolefin monomers, the catalyst system is added to the mixture and polymerized in bulk. A preferred method of polymerization includes the above noted RIM method.

The present invention will be better understood by reference to the following examples.

EXAMPLE I

A seven ounce vessel was utilized in the experiment. 1.01 grams of Isonox 132, a liquid hindered phenol antioxidant, was added to the reaction vessel along with 0.07 grams of a silicon oil, and 50 ml, that is 47.57 grams of 95/5 dicyclopentadiene/methyltetracyclododecene. At a time of 1057, that is 10:57 AM, 2.0 ml of a 0.5 molar solution of octanol in MTD, that is 1.91 grams of solution, was added to the charging vessel. At 1058, 2.0 ml of a 0.5 molar solution of ethylaluminum chloride in MTD, that is 2.08 grams of solution, was added to the vessel. The contents were mixed by shaking the vessel. At 1100, 2.0 ml of a 0.5 molar solution of dimethylchlorosilane, that is 1.94 grams of solution, was added to the charging vessel and the vessel was shaken. The charging vessel was then evacuated for 2 minutes replacing the air with nitrogen. The vessel was then cooled in an ice bath at 0° C. for 3 minutes. At 1109 tetrakis(tritridecylammonium) octamolybdate, that is 0.25 ml of a 1.0 molar solution based on Mo weighing 0.23 grams, was added. After mixing the contents of the charging vessel, they were transferred under a nitrogen atmosphere to a 6"×6"×⅛" mold, having a temperature of 75° C. At 1112, an exotherm occurred raising the temperature of the mold to 190° C. indicating the formation of the polycycloolefin. At 1120 a rigid polymer plaque was demolded with the temperature of the mold being approximately 75° C. The plaque weight was 47.88 grams and the conversion achieved was 91.9% by TGA. The chart for such a polymerization is set forth as follows:

| TIME | COMPOUND | mls | grams |
|------|----------|-----|-------|
|  | Charge Vessel Tare |  | 348.05 |
|  | Isonox 132 |  | 1.01 |
|  | Silicon oil (10 centistokes) |  | 0.07 |
|  | DCPD/MTD (95/5) | 50 | 47.57 |
| 1057 | 1-Octanol (0.5M in MTD) | 2.0 | 1.91 |
| 1058 | Et$_2$AlCl (0.5M in MTD) | 2.0 | 2.08 |
| 1100 | Me$_2$HS:Cl (0.5M in MTD) | 2.0 | 1.94 |
|  | Evacuated Vessel 2 min. |  |  |
|  | Cooled 3 min. in 0° C. bath |  |  |
| 1109 | Molybdate (1M in MTD) | 0.25 | 0.23 |
|  | Contents transferred to 75° C. mold |  |  |
|  | (6" × 6" × ⅛") |  |  |

| TIME | COMPOUND | mls | grams |
|---|---|---|---|
| 1112 | Exotherm to 190° C. | | |
| 1120 | Demolded at 75° C. | | |
| | Plaque wt. 47.88 g | | |
| | Conversion 91.9% by TGA (400° C.) | | |

EXAMPLE II

In a manner similar to Example I, a DCPD/MTD blend was prepared with an ethylene-based copolymer as follows:

| TIME | COMPOUND | mls | grams |
|---|---|---|---|
| | Charge Vessel Tare | | 347.50 |
| | CXA 3101 | | 2.50 |
| | Isonox 132 | | 1.01 |
| | Silicon Oil (10 Centistokes) | | 0.05 |
| | DCPD/MTD (95/5) | 50 | 48.96 |
| | Heated in 140° C. oven (0950. to 1305) | | |
| 1344 | 1-Octanol (0.5M in MTD) | 1.2 | 1.14 |
| 1345 | Et$_2$AlCl (0.5M in MTD) | 2.0 | 2.08 |
| 1346 | Me$_2$HSiCl (0.5M in MTD) | 2.0 | 2.07 |
| | Evacuated 6 min. | | |
| | Cooled 2 min. in 0° C. bath | | |
| 1357 | Molybdate (1M in MTD) | 0.25 | 0.29 |
| 1358 | Contents transferred to 75° C. mold (6" × 6" × ⅛") | | |
| 1406 | Exotherm to 165° C. | | |
| 1421 | Demolded at 85° C. | | |
| | Plaque wt. 37.71 g | | |

EXAMPLE III

In a manner to Example I, a blend of MTD/MNB (50/50) was prepared but without any ethylene-based functional copolymer.

| TIME | COMPOUND | mls | grams |
|---|---|---|---|
| | Charge Vessel Tare | | 344.63 |
| | Isonox 132 | | 1.0 |
| | Silicon Oil (10 Centistokes) | | 0.05 |
| | MTD | 25 | 24.55 |
| | MNB | 25 | 22.21 |
| 1350 | 1-Octanol (0.5M in MTD) | 2.0 | 1.84 |
| 1352 | Et$_2$AlCl (0.5M in MTD) | 2.0 | 1.94 |
| 1352 | Me$_2$HSiCl (0.5M in MTD) | 1.0 | 1.11 |
| | Evacuated Vessel 2 min. | | |
| | Cooled 3 min. in 0° C. bath | | |
| 1359 | Molybdate (1M in MTD) | 0.25 | 0.28 |
| 1400 | Contents Transferred to 75° C. mold (6" × 6" × ⅛") | | |
| 1401 | Exotherm to 187.5° C. | | |
| 1410 | Demolded at 75° C. | | |
| | Plaque Wt. 45.8 g | | |

EXAMPLE IV

In a similar manner to Example III, polycycloolefin monomers were polymerized in the presence of an ethylene-based functional polymer as set forth in Example IV.

| TIME | COMPOUND | mls | grams |
|---|---|---|---|
| | Charge Vessel Tare | | 345.9 |
| | CXA 3101 | | 2.5 |
| | Isonox 132 | | 1.0 |
| | Silicon Oil (10 Centistokes) | | 0.05 |
| | MTD | 25 | 24.63 |
| | MNB | 25 | 22.21 |
| | Heated in 140° C. oven (0814 to 0922) | | |
| | Evacuated 6.5 min. | | |
| | Cooled 2 min in 0° C. bath | | |
| 1010 | 1-Octanol (0.5M in MTD) | 1.2 | 1.17 |
| 1011 | Et$_2$AlCl (0.5M in MTD) | 2.0 | 2.04 |
| 1012 | Me$_2$HSiCl (0.5M in MTD) | 1.0 | 1.12 |
| 1026 | Molybdate (1M in MTD) | 0.20 | 0.20 |
| 1027 | Contents transferred to 70° C. mold (6" × 6" × ⅛") | | |
| 1028 | Exotherm to 183° C. | | |
| 1040 | Demolded at 70° C. | | |
| | Plaque wt. 30.0 g | | |

EXAMPLE V

Example V relates to a control wherein only MTD was polymerized.

| TIME | COMPOUND | mls | grams |
|---|---|---|---|
| | Charge Vessel Tare | | 347.66 |
| | Ethyl 744 (4-butyl-2,6-ditertiary-butylphenol) | | 1.0 |
| | Silicon Oil (10 Centistokes) | | 0.05 |
| | MTD | 50 | 49.49 |
| 907 | 1-Octanol (0.5M in MTD) | 2.0 | 1.98 |
| 909 | Me$_2$HSiCl (0.5M in MTD) | 2.0 | 2.00 |
| 910 | Et$_3$Al (0.5M in MTD) | 2.0 | 2.10 |
| | Evacuated Vessel 2 min. | | |
| 914.5 | Molybdate (1M in MTD) | 0.2 | 0.22 |
| 915 | Contents transferred to 90° C. mold (6" × 6" × ⅛") | | |
| 921 | Exotherm to 97.5° C., broad (12 min) | | |
| 951 | Demolded at 90° C. | | |
| | Plaque wt. 49.08 g | | |

EXAMPLE VI

In a manner similar to Example V, the MTD polycycloolefin was polymerized in the presence of ethylene-based functional polymer as follows.

| TIME | COMPOUND | mls | grams |
|---|---|---|---|
| | Charge Vessel Tare | | 348.21 |
| | Ethyl 744 | | 1.0 |
| | Silicon Oil (10 Centistokes) | | 0.05 |
| | CXA 1124 | | 2.50 |
| | MTD | 50 | 49.76 |
| | Heated in 140° C. oven (942 to 1124) | | |
| 1307 | 1-Octanol (0.5M in MTD) | 1.4 | 1.31 |
| 1310 | Et$_3$Al (0.5M in MTD) | 2.0 | 2.02 |
| 1312 | Me$_2$HSiCl (0.5M in MTD) | 2.0 | 1.98 |
| | Evacuated 7 min. | | |
| 1319 | Molybdate (1M in MTD) | 0.2 | 0.23 |
| 1320 | Contents transferred to 140° C. mold (6" × 6" × ⅛") | | |
| | Exotherm 171° C. | | |
| 1420 | Heated mold to 195° C. | | |
| | Demolded at 90° C. | | |
| | Plaque Wt. 49.12 g | | |

EXAMPLE VII

In a manner similar to Example VI, another blend was prepared containing a different type of an ethylene-based functional polymer.

| TIME | COMPOUND | mls | grams |
|---|---|---|---|
| | Charge Vessel Tare | | 350.40 |
| | Ethyl 744 | | 1.0 |
| | Silicon Oil (10 Centistokes) | | 0.05 |
| | CXA 3101 | | 2.50 |

-continued

| TIME | COMPOUND | mls | grams |
|---|---|---|---|
|  | MTD | 50 | 32.02 |
|  | Heated in 140° C. oven (953 to 1126) |  |  |
| 952 | 1-Octanol (0.5M in MTD) | 1.4 | 1.34 |
| 953 | i-Bu₃Al (0.5M in MTD) | 2.0 | 1.97 |
| 954 | Me₂HSiCl (0.5M in MTD) | 2.0 | 1.92 |
|  | Evacuated 4.5 min. |  |  |
| 1004 | Molybdate (1M in MTD) | 0.2 | 0.23 |
| 1005 | Contents transferred to 140° C. mold (6" × 6" × ⅛") |  |  |
|  | Exotherm 182.5° C. |  |  |
| 1103 | Heated mold to 185° C. |  |  |

Various physical properties were obtained from the above Examples and are set forth in Table I.

TABLE I

| EX | COMP | ETHYLENE-BASED FUNC-TIONAL POLYMER | NOTCHED IZOD (ASTM D-256) (FT-LB/IN), Room Temp. 80° C. AGING | | |
|---|---|---|---|---|---|
|  |  |  | 0 | 16 HR | 43 HR | 112 HR |
| I | DCPD/MTD 95/5 | — | 0.8 | — | 0.9 | 0.5 |
| II | DCPD/MTD 95/5 | CXA 3101 (5%) | 9.2 | — | 8.0 | 4.5 |
| III | MTD/MNB (50/50) | — | 0.8 | — | 0.55 | 0.64 |
| IV | MTD/MNB (50/50) | CXA 3101 (5%) | 8.7 | 8.5 | 8.5 | — |
| V | MTD | — | 1.3 | — | — | — |
| VI | MTD | CXA 1124 (5%) | 2.9 | — | — | — |
| VII | MTD | CXA 3101 (5%) | 4.6 | — | — | — |

As apparent from Table I, the notched Izod dramatically improved with the utilization of the ethylene-based functional polymer. Moreover, thermal aging properties were also dramatically improved. Thus, it is apparent that blends of polycycloolefin polymers prepared according to the present invention yield improved physical properties as well as thermal aging properties.

While in accordance with the patent statutes, a preferred embodiment and best mode have been set forth, the scope of the invention is not limited thereto but rather by the scope of the attached claims.

What is claimed is:

1. An alloy of a polycycloolefin polymer, comprising: at least one polycycloolefin polymer, said polycycloolefin polymer being selected from the group consisting of a homopolymer made from a polycycloolefin monomer, an interpolymer made from two or more polycycloolefin monomers, and an interpolymer made from one or more polycycloolefin monomers with one or more cycloolefin monomers, said monomers having 1 to 4 double bonds therein and polymerized by ring-opening polymerization in the presence of a dissolved ethylene copolymer to form a polycycloolefin polymer alloy having improved thermal stability, the amount of said ethylene copolymer being 15 percent or less by weight based upon the total weight of said ethylene copolymer and said at least one polycycloolefin polymer, said ethylene copolymer being a copolymer of an ethylene monomer and a vinyl ester monomer with said ester portion of said ester monomer containing a total of from 1 to 10 carbon atoms and the weight of said vinyl ester portion of said ethylene-vinyl ester copolymer being from about 5 to about 50 percent by weight.

2. An alloy of a polycycloolefin polymer according to claim 1, wherein said one or more polycycloolefin monomers is bulk polymerized in a mold.

3. An alloy of a polycycloolefin polymer according to claim 1, wherein said one or more cycloolefin monomers is a monocyclo monoolefin or a monocyclo diolefin having from 4 to 14 carbon atoms, and wherein said polycycloolefin monomer or said two or more polycycloolefin monomers, independently, has from 2 to 10 rings with from 7 to about 35 carbon atoms.

4. An alloy of a polycycloolefin polymer according to claim 3, wherein the amount of said ethylene copolymer is from about 1 percent to about 10 percent by weight.

5. An alloy of a polycycloolefin polymer according to claim 4, wherein said ethylene copolymer is a copolymer of ethylene and vinyl acetate.

6. An alloy of a polycycloolefin polymer according to claim 3, wherein said monocyclic olefin is cyclopentene, cyclooctene, or 1,5-cyclooctadiene, wherein said polycycloolefin monomer is dicyclopentadiene, norbornene, methylnorbornene, ethylnorbornene, propylnorbornene, phenylnorbornene, or cyclohexenylnorbornene, and wherein at least 90 percent by weight of said ethylene copolymer is dissolved in said polycycloolefin monomers or said cycloolefin monomers.

7. An alloy of a polycycloolefin polymer according to claim 5, wherein said monocyclic olefin is cyclopentene, cyclooctene, or 1,5-cyclooctadiene, wherein said polycycloolefin monomer is dicyclopentadiene, norbornene, methylnorbornene, ethylnorbornene, propylnorbornene, phenylnorbornene, or cyclohexenylnorbornene, and wherein at least 90 percent by weight of said ethylene copolymer is dissolved in said polycycloolefin monomers or said cycloolefin monomers.

8. An alloy of a polycycloolefin polymer according to claim 3, wherein said one or more polycycloolefin monomers is bulk polymerized in a mold.

9. An alloy of a polycycloolefin polymer according to claim 5, wherein said one or more polycycloolefin monomers is bulk polymerized in a mold.

10. An alloy of a polycycloolefin polymer according to claim 7, wherein said one or more polycycloolefin monomers is bulk polymerized in a mold.

* * * * *